Feb. 17, 1931.  H. J. NEUFANG  1,793,002
PLOW
Filed Jan. 19, 1927   4 Sheets-Sheet 1

INVENTOR
Henry J. Neufang
BY
Crumpton & Griffith
his ATTORNEYS

Feb. 17, 1931.  H. J. NEUFANG  1,793,002
PLOW
Filed Jan. 19, 1927  4 Sheets-Sheet 4

Inventor
Henry J. Neufang
By Cumpston + Griffith
his Attorney

Patented Feb. 17, 1931

1,793,002

UNITED STATES PATENT OFFICE

HENRY J. NEUFANG, OF ATLANTA, NEW YORK, ASSIGNOR, BY DIRECT AND MESNE ASSIGNMENTS, TO BOGGS PLOW COMPANY, INC., OF ATLANTA, NEW YORK, A CORPORATION OF NEW YORK

PLOW

Application filed January 19, 1927, Serial No. 162,190, and in Canada November 9, 1926.

The present invention relates to plows, and more particularly to those adapted for right and left hand plowing and has for its object to provide an improved plow of this type which can be economically manufactured and operated and which is simple in construction and efficient in operation.

Another object of the invention is to provide an improved plow having a plurality of plowing implements movable selectively to plowing position and arranged for movement to said position by the travel of the plow.

Another object is the provision in such a plow of elevating means for raising the plowing implements for movement selectively to plowing position, operated by the travel of the plow while maintaining the plow supporting wheel or wheels in stable supporting contact with the ground and without disturbing the equilibrium of the apparatus.

Another object is to provide a two-way plow having plowing implements rotatable progressively in the same direction by contact of the implements with the ground to bring them successively to plowing position, together with means operated also by the travel of the plow, as for example, by the rotation of the supporting wheel or wheels, for elevating the implements for such movements while maintaining the weight of the apparatus on its supporting wheel or wheels in stable equilibrium. More specifically stated, it is an object of the invention to provide such an apparatus in which such elevation of the implements and the adjustment of the same to plowing position may be rapidly accomplished and secured with a minimum of effort by merely releasing such parts for operation by the normal travel of the plow in the work.

A further object is to provide an apparatus of the character described provided with means operated, for example, by the movement of the implements to plowing position, for correcting the inclination of the right and left hand implements respectively to compensate for the depression of one of the wheels in a furrow.

A further object is to provide such an apparatus capable of operation rapidly, in short space, with a minimum of attention on the part of the operator so that the latter may devote his attention primarily to the operation of the tractor, particularly on uneven ground or a hillside.

To these and other ends the invention consists in certain improvements and combinations of parts, all as will be hereinafter more fully described, the novel features being pointed out in the claims at the end of the specification.

In the drawings.

Similar reference numerals throughout the several views indicate the same parts.

The present application is a continuation in part of an application filed by me for improvements in plows, June 10, 1925, and bearing Serial Number 36,090.

Figure 3:
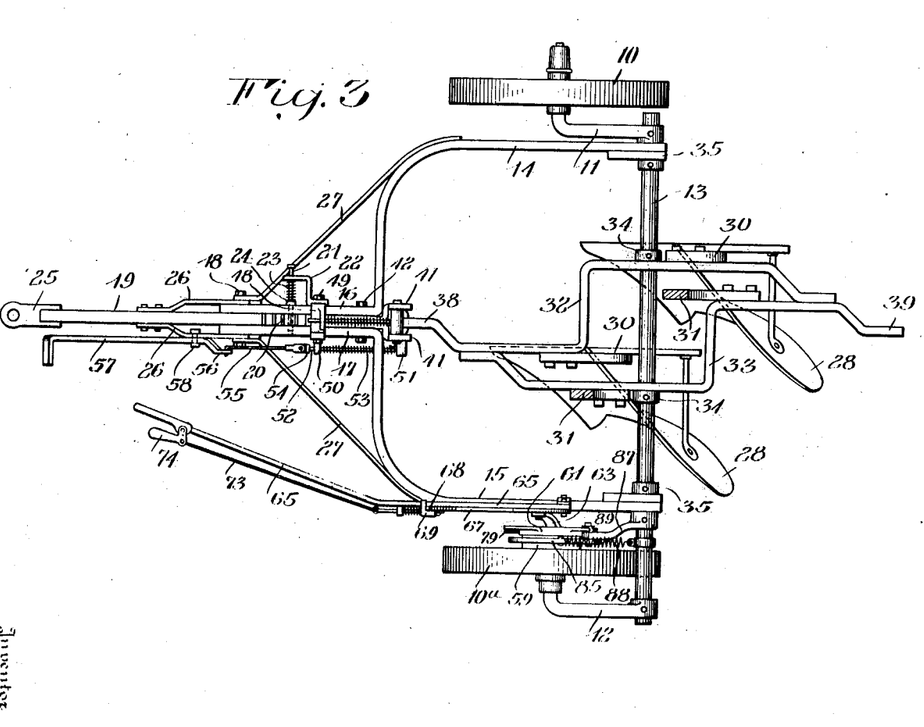
Figure 3 is a top plan view with one set of plows removed.

The invention embodies an improved right and left hand plow which may be horse drawn or pulled by a tractor as desired, and which comprises supporting wheel means such as the pair of wheels 10 and 10a carrying a main frame including the angularly constructed axle members 11 and 12 connected in any suitable manner, but preferably by the transverse bar 13 forming in the present instance a part of the axle. The main frame further includes the side bars 14 and 15 which are connected with the axle members preferably through the medium of the transverse bar 13. The side bars are bent to form transverse portions which have forwardly extending spaced extensions 16 and 17 between which is pivoted at 18 a draw bar 19. The draw bar is preferably provided at its rear end with a notched or toothed segment 20 and is held in different positions of adjustment by a latch bolt 21 reciprocally mounted in a bracket 22 and held in locking position by a spring 23 disposed upon the bolt between the head 24 thereof and the bracket 22 as shown in Figure 3. The outer end of the draw bar which is provided with a suitable clevis 25 of any desired construction may be raised or lowered to suit different operating conditions or in accordance with the depth at which the plows are operated. The draw bar is preferably reinforced or braced in front of the frame extensions 16 and 17 by a pair of relatively short bars 26, the front ends of which are rigidly secured to the draw bar and the rear ends connected with the pivot bolt 18 thereof as shown in Figure 3. The frame members 14 and 15 and the draw bar 19 are together braced by a pair of convergently arranged bars 27 having their front ends connected preferably with the draw bar pivot bolt 18 and their rear ends connected with the frame members in any desired manner.

Figure 1:
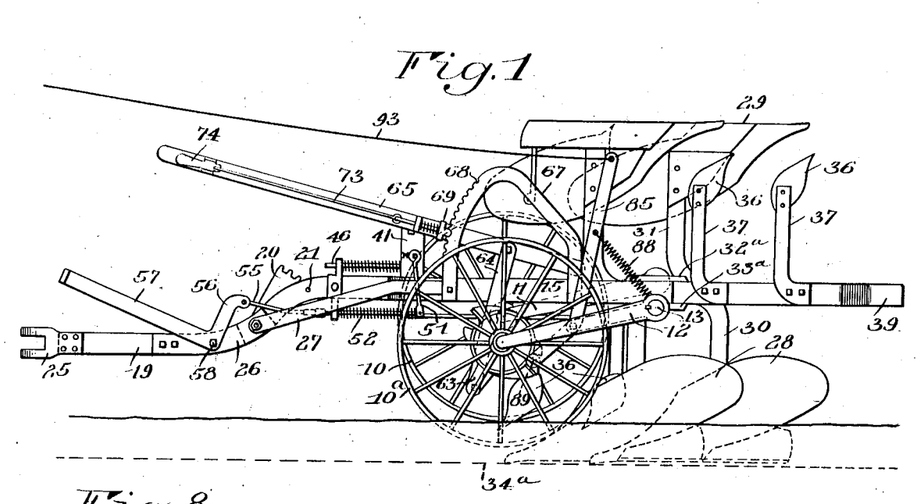
Figure 1 is a side elevation illustrating one embodiment of the invention.
Figure 2:
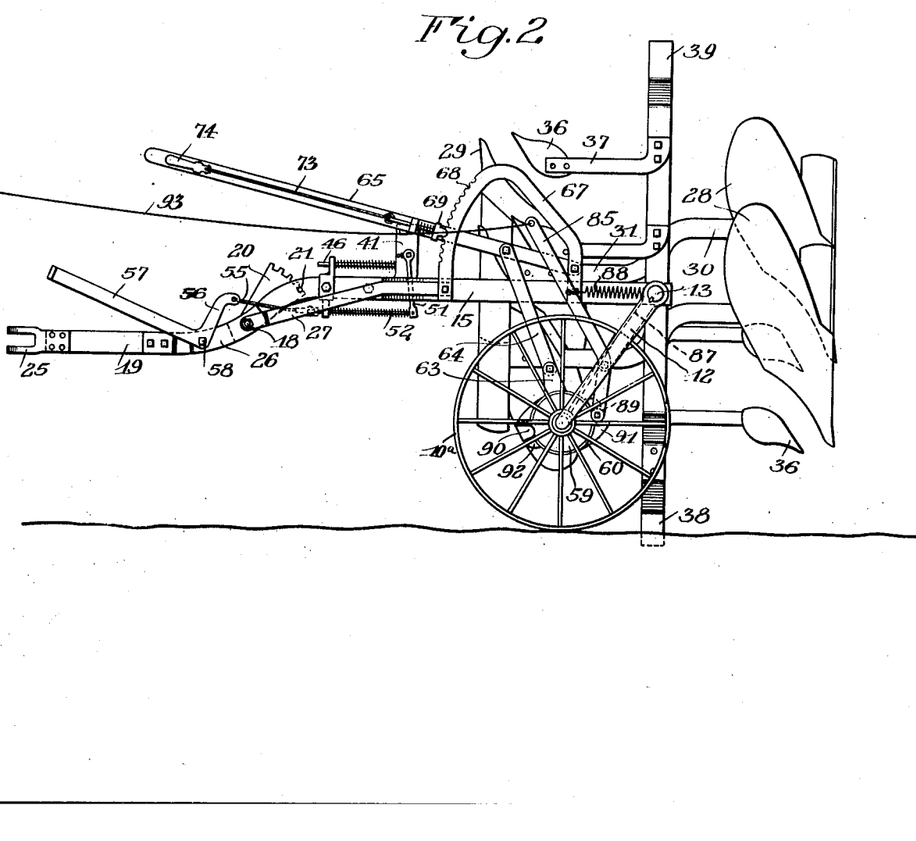
Figure 2 is a somewhat similar view with the plow carrying frame partially reversed.

The two sets of plows indicated generally at 28 and 29, are provided with short beams or standards 30 and 31 respectively, having their inner ends bent and suitably secured to a rigid frame construction adapted to swing about a transverse axis afforded preferably by the axle or pivot bar 13, said frame preferably comprising the angular shaped bars 32 and 33 which are connected in any suitable manner and through which the pivot bar 13 is extended, said frame being held against lateral movement by suitable collars 34 rigidly secured on the pivot bar as shown in Figure 3. The frame members 14 and 15 have their rear ends pivoted upon the bar 13 and are held against lateral movement thereon preferably by suitable collars or brackets 35 which are also shown in Figure 3. The pivoted frame construction embodying the bars 32 and 33 while suitable for the purpose provided, may be modified or changed as desired. The frame is provided in front of the main plowing implements with the usual colters 36 for breaking or turning the sod in advance of the mold boards, the same being connected with the frame by suitable standards 37 as shown in Figures 1 and 2. The frame members 32 and 33 are provided with extended portions 38 and 39 respectively for engaging the ground during the swinging operations from one plowing position to another and while the plow is advancing, whereby the continued turning of the frame is effected from the plowing position shown in Figure 2 to a position such as shown in Figure 1, the frame having been preferably raised and released for turning by means which will be hereinafter described.

The bar 32 of the plow carrying frame is provided at its upper side with a removable portion 32a and the opposite bar 33 is provided at its lower side with a removable portion 33a. These portions serve to increase the depth of the bars at the bearing points of the axle 13 to provide sufficient material to permit one of the bearings for the axle to be offset upwardly and the other downwardly so that the frame will remain substantially horizontal while the axle is inclined alternately in opposite directions to the horizontal, which is desirable since one of the wheels of the plow operates within while the other travels without the furrow. By thus offsetting the bearings for an axle, or drilling the holes for the shaft 13 at the proper inclination to take care of the difference in the operating positions of the wheels, the plow-carrying frame, in either position to which it is swung will remain substantially horizontal. This serves to maintain the plows on an even keel regardless of the fact that one wheel operates within the furrow, the bottom of which is indicated by the dotted line 34a in Figure 1.

Such construction provides a compensating means operated by the rotation of the plow carrying frame for correcting the inclination of the implements in plowing position with either of the wheels in a furrow, but, of course, other and equivalent means will suggest themselves to those skilled in the art for accomplishing the same result.

The portions 32a and 33a of the frames, though shown as being removably connected with the bars by the screw bolts 35a may be formed integral with said bars if desired. By making said members removable the frame may be more conveniently applied to the shaft 13.

It will be understood that a certain amount of the dirt thrown over by the mold-board of the plow will fall back into the furrow and partially fill the same, particularly when plowing in relatively soft ground. The wheel operating in the furrow may therefore, not travel upon the extreme bottom of the furrow, but upon a certain portion of the dirt which falls into the same, the wheel 10a being indicated in such a position in Figure 1.

Figures 4, 5, 6, 7:
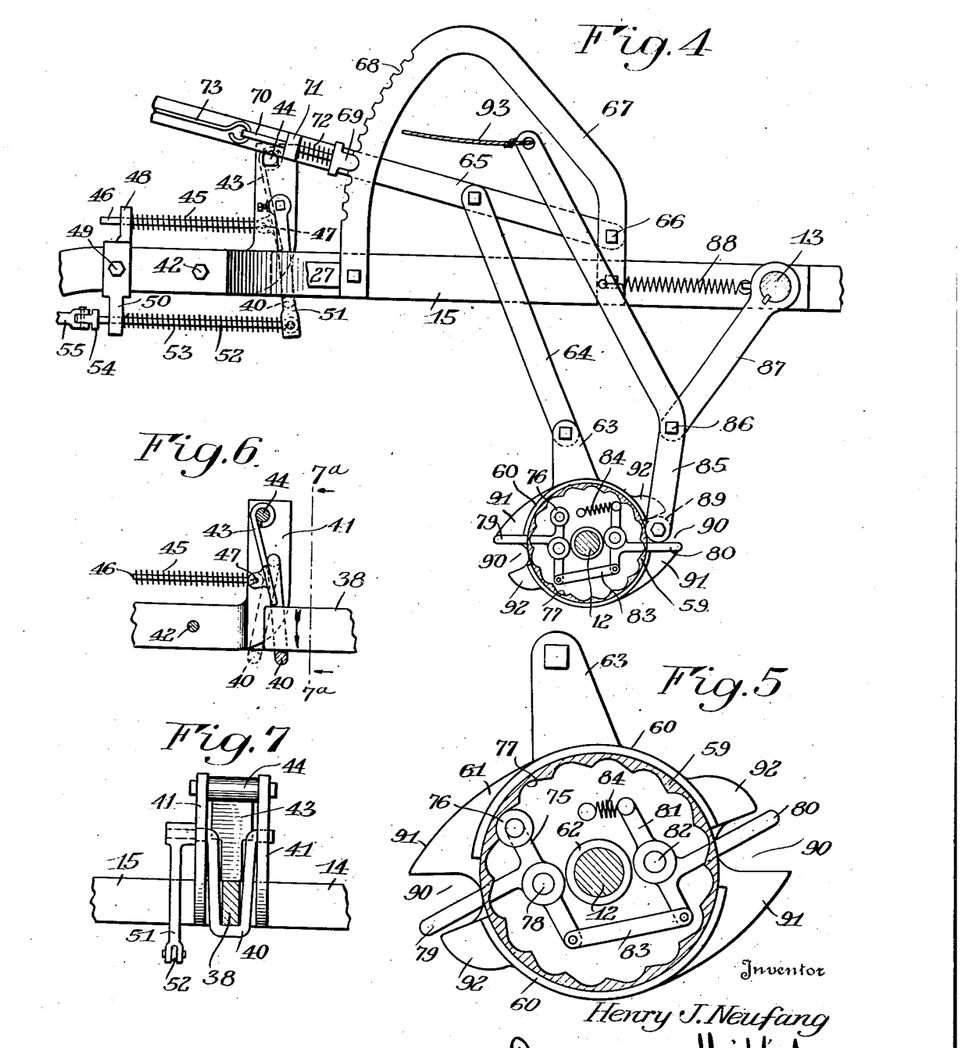
Figure 4 is a fragmentary sectional elevation illustrating on an enlarged scale the plow raising clutch in uncoupled relation with respect to the wheel drum.
Figure 5 is a detail sectional elevation through the wheel drum showing the clutch in operating position.
Figure 6 is a fragmentary sectional elevation illustrating the means for latching the reversible plow supporting frame in one of its operating positions.
Figure 7 is a sectional elevation taken on line 7a—7a of Figure 6.
Figure 8:
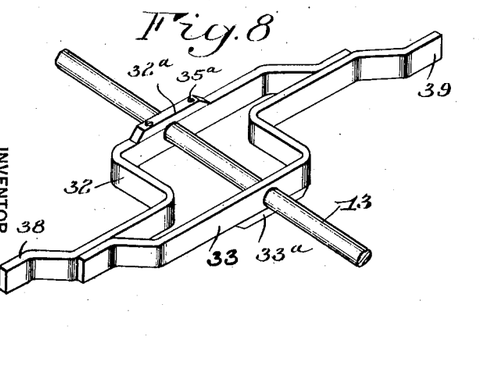
Figure 8 is a perspective view of the plow carrying frame showing the manner of inclining the axle with respect thereto.

The revoluble frame is normally held during operation of the plow in the position shown in Figure 1 by the locking means shown in Figures 6 and 7. This means preferably comprises a yoke shaped member 40 disposed between and pivotally supported by a pair of angular shaped bracket members 41 having their front ends rigidly secured between the frame extensions 16 and 17 by a bolt 42.

The revoluble frame is prevented from swinging upwardly by a latch member 43 pivoted at 44 between the bracket members 41 and is held in latching position as shown in Figure 6 by a spring 45 on a rod 46, the rear end of which is pivotally connected with the latch at 47 while its front end is slidably supported by a bracket 48 which is clamped upon the frame extensions 16 and 17 by a bolt 49 which is also adapted to secure the bracket 22 and an additional bracket 50 provided for a purpose which will hereinafter appear. The spring 45 is adapted to urge the latch 43 to the position shown in Figure 6, the latch being automatically displaced by the ends 38 and 39 of the frame when moved downwardly into engagement therewith but being automatically returned by the spring 45 when said ends reach their lowest position in the yoke 40. Release of the frame for a rotating movement is effected by moving the yoke 40 to the dotted line position shown in Figure 6, which is accomplished through the medium of a crank arm 51 connected with the yoke 40 and actuated by a rod 52 slidably disposed in the bracket 50 and being automatically returned by a spring 53 when released. The rod 52 is provided with a head or clevis 54 to which is pivotally secured a forwardly extending connection 55 having pivotal engagement with an arm 56 of an operating lever 57 which is pivoted at 58 to one of the brace members 26 as shown in Figures 1 and 3. The lever 57 may be conveniently moved to release position from the driver's seat on the tractor, not shown, either by hand or foot as desired, its length and inclination being regulated to suit the particular type of tractor used.

The mechanism for regulating the depth at which the plows are adapted to operate and for raising the frame upon which the plows are mounted include cooperating parts for effecting both movements as will hereinafter appear.

The raising of the main frame at the end of each furrow to a position at which the plow carrying frame can be readily swung upon its transverse axis or about the shaft 13 is effected by means of a suitable clutch such as that illustrated in Figures 4 and 5, these views showing the clutch respectively in normal release and coupled positions. Upon advancement of the wheels with the clutch in coupled position the main frame including the shaft or pivot bar 13 will be elevated as indicated in Figure 2, by means of this clutch mechanism.

The clutch is preferably shown applied to one wheel only but may be applied to both if desired. It embodies a drum 59 rigidly connected with the wheel 10a and normally rotating within the arcuate portions 60 of a casing 61 having a sleeve 62 journalled on the inner end of the axle 12 and held against longitudinal movement upon the axle by any suitable means not shown. The casing 61 carries an arm 63 pivotally connected with a link 64 which in turn is pivotally connected with an operating lever 65. The lever is pivoted at 66 to an upstanding support 67, preferably comprising an inverted U-shaped frame member, the lower ends of which are suitably connected with the forwardly extending frame member 15 as shown in Figure 4. The forward leg of the U-shaped frame member is provided with a series of notches 68 adapted to receive a pawl 69 on a stem 70 slidably mounted in a lug 71 on the lever 65, the stem carrying a spring 72 for moving the pawl to locking position when released. An operating rod 73 for releasing the pawl 69 is connected at its inner end with the stem 70 and at its outer end with a hand grip lever 74 of any preferred type.

The casing 61 is coupled with the drum 59 when desired by a lever 75 having a roller 76 adapted to take into notches 77 of the drum as shown in Figure 5. The lever 75 is pivoted to the casing at 78 and is provided with an operating extension 79 similar to an extension 80 on a control lever 81 which is pivoted to said casing at 82 and operatively connected with the lever 75 by a link 83. A spring 84 is adapted to move the lever 75 to a clutching position as shown in Figure 5 when the lever arm 80 is disengaged from a control lever 85 pivoted at 86 to an arm 87 rigid on the shaft 13 and paralleling the angular extension of the axle 12 which is also rigidly connected with the shaft 13. The control lever 85 is held in the locking position shown in Figure 4 by a spring 88 and carries at its lower end a roller 89 for normally engaging either of the lever arms 79 and 80, whereby to render the clutch inoperative. In the normal position of the lever 85 the roller 89 is disposed within one of the notches 90 formed by the relatively long and short lugs 91 and 92 respectively which are projected from the casing 60 as shown in Figure 5. The control lever 85 is adapted to be moved to release position by a cable or other suitable connection 93 extended forwardly to a point within convenient reach of the driver. Upon release of the control lever from the position shown in Figure 1 the spring 84 will move lever 81, link 83 and lever 75 to position the roller 76 in one of the notches 77 of the drum 59, whereby to couple the wheel 10a with the casing 60, so as to rotate the latter, thus moving the arm 63 in a counter clockwise direction as viewed in Figure 1. This serves, through the medium of the link 64, lever 65 and frame member 67 to raise the main frame to the position shown in Figure 2. During such raising movement the roller 89 will travel upon the casing and over one of the cams or lugs 92 and will automatically drop into one of the notches 90 and engage one or the other of the lever arms 79 and 80 to disconnect the clutch as shown in Figure 4.

To lower the plows, the lever 85 must be again released, this time from the position shown in Figure 2 whereby the clutch will again be rendered effective to rotate the casing 61 and arm 63 from the position shown in Figure 2 back to that shown in Figure 1, the link 64 during such movement serving to pull the main frame down and permitting the plows to enter the ground ready for plowing the next succeeding furrow.

The depth at which the plows are operated can easily be regulated by raising or lowering the lever 65 as desired.

The lever 85 and arm 87 when in normal clutch releasing position as shown in Figures 1 and 4 form means for bracing and supporting the main frame in cooperation with the arm 63, link 64 and U-shaped frame member 67.

In operation, as indicated by the above description of the construction, as the plow reaches the end of a furrow, lever 85 may be pulled forwardly, as by means of the cord 93, to couple the elevating means to the wheel, with the result that the plow frame is raised by the rotation of the wheel, or in other words, by the travel of the plow or the power by which it is drawn, and the plowing implements lifted until they contact lightly with or substantially clear the ground in which position they are locked by the operation of the elevating mechanism. Lever 57 is operated, preferably, though not necessarily at the same time that the elevating mechanism is released as above described, to release the rotary plow frame so that the engagement of the implement and frame portions with the ground immediately starts rotation of the frame on which the implements are carried, on its axis, or in the present instance on the crank axle 13. It will be noted that the points and heels of the implements and the ends of the landsides and the ends 38 and 39 of the rotary plow frame, together with the colters, provide a plurality of contacts with the ground by means of which the rotary plow frame is rotated as if a wheel rolling on the ground to positively and continuously rotate it from one position of adjustment to another, or in other words, until the frame has been turned through an angle of 180° to bring the other plow or plows down into plowing position in which position they are secured by the locking engagement of one of the frame ends 38 or 39 with the device described for that purpose.

The simultaneous release of the elevating mechanism and the rotary plow frame serves to raise the latter with sufficient rapidity so that the implements and their frame rotate in light contact with the ground, to avoid the lifting of the plow supporting wheels from the ground and such simultaneous release and operation of these mechanisms contributes to the rapidity and ease of operation of the plow at the end of the furrow to change from a right hand to a left hand plowing implement or vice versa for reverse movement back across the field in the opposite direction. It will be noted as one of the important advantages of the invention that the mechanism for elevating the implements for reversal is interposed and operates between the supporting wheel means and the implements so as to raise the implements and the frame by which they are carried by downward pressure on the wheel means as a support, so that the weight of the parts is maintained on the wheels without disturbing their contact with the ground. By this arrangement, therefore, the implements and their supporting frame means are positively raised relative to the wheels so that the implements are raised and secured in elevated position in a positive and reliable manner. The apparatus thus operates without disturbing the equilibrium of the apparatus as a whole which is particularly advantageous on uneven ground or in plowing a hillside.

These plow raising and adjusting movements are readily accomplished during the normal turning of the plow at the end of the furrow. When a plow or tractor is employed it may even be left continuously in high speed as such movements are accomplished during the turning of the plow and when the plow has been turned to commence the next furrow, the elevating mechanism is again tripped to positively lower the implements and their supporting frame means and drive the implements into the ground for plowing in the opposite direction. As applied to a two-way plow the rotation of the frame for substituting a plowing implement of different hand, serves to adjust the inclination of the plowing implement to compensate for the depression of one of the wheels in a furrow. But of course the invention may also be employed with other than right and left hand implements, as for example, for substituting one kind of implement for another for plowing in the same direction.

The operation of the plow is thus rapidly accomplished by the operator either from a position on the plow frame, for example, or on the tractor, and by the force by which the plow is drawn, without requiring any attention or exertion on the part of the operator to move the relatively heavy machine parts other than the slight and momentary effort of tripping the elevating and rotary plow supporting parts as described, which automatically complete their cycles of operation and relock themselves in position.

The construction employed is exceedingly simple and compact. The frames are preferably, but not necessarily pivoted directly on the crank axle which may be directly combined likewise with the elevating mechanism to afford a minimum of parts and of weight. Such construction makes possible likewise a minimum of size, the length, for example, being exceedingly short, particularly for a gang plow, and adapted for operation by a small tractor. The above and other advantageous features of construction and operation provide a plow which practically eliminates dead furrows, back furrows and idle driving at the furrow ends, and one which is rapid and easy to operate, not only on level ground, but also on uneven ground and in hillside plowing.

While I have illustrated and described one embodiment of my invention, it will be understood that different modifications of the construction shown may be readily made without departing from the principles of the invention as embodied in the claims.

I claim as my invention:

1. A plow comprising in combination, a pair of wheels, an axle connecting said wheels, a frame revolubly mounted upon the axle for rotation in one direction through a circle to and from different operating positions and right and left hand plowing implements carried by said frame for alternate engagement with the ground when the frame is swung through a circle.

2. A plow comprising in combination, a pair of wheels and an axle connecting the same, a pivoted frame revolubly mounted upon the axle for rotation in one direction thereon from one operating position to another, right and left hand ground working implements mounted upon said pivoted frame, and a locking device adapted to receive oppositely spaced portions of the said frame to hold it in its different operating positions.

3. A plow comprising in combination, a pair of wheels and an axle connecting the same, a pivoted frame revolubly mounted upon the axle, ground working implements carried by said frame, a second frame connected with the axle and a locking device upon said second frame comprising a releasable spring pressed support for receiving oppositely spaced portions of the first mentioned frame and a spring pressed latch arranged to be released by the first mentioned frame when the latter is swung from one position of adjustment to another.

4. A plow comprising in combination, a pair of wheels and an axle connecting the same, a frame pivoted upon the axle to swing in one direction thereon to different operating positions, right and left hand plows carried by said frame adapted to alternately engage the ground for each complete swinging movement of the frame, a second frame connected with the axle and a locking device upon said second frame adapted to receive the opposite ends of the first mentioned frame when the latter is swung to its different operating positions and means for regulating the height of the second mentioned frame to vary the depth at which the plows are adapted to operate.

5. A plow comprising in combination, a pair of wheels, an axle connecting the same, a frame connected with the axle, a second frame pivoted upon the axle to swing in one direction through a circle to different operating positions, means upon the first mentioned frame for holding said second frame in operating position, oppositely arranged plowing implements carried by said second mentioned frame adapted to alternately engage the ground for each complete swinging movement thereof, and means for raising and lowering the first mentioned frame.

6. A plow comprising in combination, a pair of wheels and an axle connecting the same, a frame connected with the axle, of a second frame mounted to swing upon the axle in one direction through a circle to different operating positions, means upon the first mentioned frame for holding the second frame in its different positions of adjustment, oppositely arranged plowing implements carried by said second frame and means adapted to effect raising of the first mentioned frame to a predetermined position from which the second frame is adapted to swing upon the axle and to engage the ground whereby through cooperation with the latter its swinging movement is effected while the plow is advancing.

7. A plow comprising in combination, a frame including an axle and wheels for supporting the same, of a second frame mounted to swing upon the axle in one direction through a circle to different operating positions, oppositely arranged plowing implements carried by said second frame for alternate engagement with the ground for each complete revolution of the second mentioned frame, and means upon the first mentioned frame for automatically locking the second frame when moved to its different positions of adjustment.

8. A plow comprising in combination, a pair of wheels and an axle connecting the same, a frame connected with the axle, of a second frame having right and left hand plows thereon, said second frame being mounted upon the axle for a swinging movement in one direction to alternately position opposite portions thereof in engagement with the ground whereby to effect rotation of the second mentioned frame from one plowing position to another during advancement of the machine and releasable locking means for securing the second frame upon the first in its different positions of adjustment.

9. A plow comprising in combination, a pair of wheels and an axle connecting the same, a frame connected with the axle, of a second frame having oppositely positioned right and left hand plows thereon, said second frame being mounted upon the axle for a swinging movement in one direction through a circle to different operating positions, a releasable locking device for alternately engaging oppositely spaced parts of the second frame to lock the latter in different positions of adjustment, and means for vertically adjusting said frames upon the wheels.

10. A plow comprising in combination, and axle and wheels for supporting the same, of right and left hand plowing implements, supporting means for said implements adapted to swing in one direction upon said axle through a circle to cause the implements to alternately engage the ground for each complete revolution of said supporting means, and means for locking said supporting means in its different positions of adjustment.

11. A plow comprising in combination, an axle and wheels for supporting the same, of a frame having right and left hand ground working implements thereon, said frame being mounted upon the axle for a swinging movement in one direction through a circle to different operating positions during advancement of the machine and lifting mechanism by which said frame may be adjusted to different heights.

12. A plow comprising in combination, an axle and wheels for supporting the same, of a frame having right and left hand ground working implements thereon, said frame being mounted upon the axle for a swinging movement in one direction through a circle to different operating positions and adapted to be swung to each operating position through engagement with the ground during advancement of the machine, means for regulating the height of the axle to vary the depth at which the implements are adapted to operate, and a holding device adapted to hold said frame in each of its operating positions.

13. A plow comprising in combination, a pair of wheels and an axle connecting the same, a frame extending forwardly of the axle and having its side portions connected therewith, a second frame having right and left hand plows thereon, said second frame being pivoted intermediate its ends upon the axle to assume different operating positions thereon by a rotating movement in one direction through a circle, means for regulating the height of said first mentioned frame to vary the depth at which the plows are adapted to operate and a holding device for the second mentioned frame adapted to engage opposite portions thereof when adjusted to its different positions.

14. A plow comprising in combination, a pair of wheels having axle portions connected by a transverse bar, a frame connected with said bar including side portions extending forwardly thereof, holding means disposed centrally upon said frame, a second frame mounted to swing upon the bar between said side frame portions and having a portion at each end adapted to cooperate with the ground during advancement of the plow to swing said second frame from one operating position to another and to engage said holding means in either of its operating positions and right and left hand plows carried by the second mentioned frame.

15. A plow comprising in combination, a pair of wheels, a support carried by said wheels comprising forwardly extended side portions provided with a transverse connecting portion, a frame mounted for rotation between said side portions about a transverse axis and having right and left hand plowing implements and being provided with opposite end portions each adapted in one position of the frame to cooperate with the ground during advancement of the plow whereby to swing the frame to one of two operating positions and holding means upon said transverse connecting portion adapted to receive said end portions when the frame is swung to its different operating positions.

16. A plow comprising in combination, a pair of wheels, a frame supported by said wheels, a second frame revolubly mounted between the wheels for rotation in one direction through a circle to different operating positions and having right and left hand plowing implements thereon, the opposite ends of said second frame in the different operating positions thereof being adapted to project forwardly of the axis of the wheels, and holding means for said ends carried by the first mentioned frame between the sides thereof and forwardly of the axis of the wheels.

17. A plow comprising in combination, a pair of wheels, an axle connecting said wheels, a frame having right and left hand plowing implements thereon, said frame being mounted for rotation upon the axle through a circle and arranged to have two operating positions in either of which it is adapted to maintain one of the plows on substantially an even keel when in plowing position with either of the wheels operating in a furrow and means for holding the frame in its different operating positions.

18. A plow comprising in combination, a pair of wheels and an axle connecting the same, a frame adapted to be supported by said axle, a second frame mounted to swing upon said axle through a circle and having right and left hand plows thereon, said second frame having spaced bearings upon said axle offset one with respect to another whereby to maintain the operating plow substantially on an even keel when in plowing position with either wheel operating in a furrow and means for holding the second mentioned frame in adjusted position upon the first.

19. A plow comprising in combination, a pair of wheels, a frame disposed between the wheels including spaced side bars, an axle connecting the wheels and extending through said bars to form a support upon which the frame is adapted to rotate when moving from one operative position to another, oppositely positioned plowing implements carried by the frame, the axle and its bearings in the said bars being relatively inclined whereby when either wheel of the plow is operating in a furrow the ground engaging implement will remain substantially on an even keel during operation, a second frame carried by the axle, holding means upon said second frame adapted to receive the opposite ends of the first mentioned frame, and release means for said holding means.

20. A plow comprising in combination, a pair of wheels and an axle connecting the same, a frame connected with the axle including side and transverse portions, a draft connection secured to said frame, a holding device upon said transverse frame portion and a plow carrying support having spaced bearings journaled upon the axle and permitting said support to rotate about the latter, the opposite ends of the support being adapted to engage said holding device when the support is swung from one position of operation to another.

21. A plow comprising in combination, a pair of wheels and an axle connecting the same, a frame including transverse and side portions, the latter being pivotally connected with the axle, a draft connection secured to said frame, a holding device connected with the transverse frame portion, a plow carrying frame rotatable upon the axle and having opposite substantially aligned end portions adapted to swing into engagement with said holding device when the plow carrying frame is swung from one operating position to another.

22. A plow comprising in combination, a pair of wheels, a frame supported by said wheels, a second frame having separate sets of right and left hand plowing implements on opposite sides thereof, said second frame being pivoted intermediate its ends to swing upon the first frame about a transverse axis, said frames being so constructed and mounted one relative to another as to maintain the plows of each set on substantially an even keel when in plowing position with either of the wheels operating within a furrow, and means for holding the second frame in different adjusted positions upon the first mentioned frame.

23. A plow comprising in combination, a pair of wheels, angularly disposed axle portions upon which said wheels are journalled, a connecting member between said axle portions, a frame extending forwardly of said axle portions and pivoted to swing relative thereto, a second frame mounted for rotation in one direction through a circle about the axis of said connecting member to different positions of adjustment, ground working implements supported on opposite sides of said second frame, and means arranged to support the second frame to hold it in its different positions of adjustment whereby to permit alternate operation of the ground working implements carried by the second frame.

24. A plow comprising in combination, a pair of wheels, angularly disposed axle portions upon which said wheels are journalled, a connecting member between said axle portions, a frame extending forwardly of said axle portions and pivoted to swing relative thereto, a second frame mounted for rotation in one direction through a circle about the axis of said connecting member to different positions of adjustment, ground working implements supported on opposite sides of said second frame, holding means on the first mentioned frame in advance of said connecting member adapted to engage spaced portions of the second frame to hold the latter in its different positions of adjustment, and means for raising and lowering the first mentioned frame.

25. A plow comprising in combination a pair of wheels, a frame extending forwardly of and supported by said wheels, a second frame having oppositely spaced ground engaging portions, said second frame being pivoted intermediate its ends to swing between said wheels through a circle by a rotary movement in one direction about a transverse axis, said movement being effected in part through cooperation of said portions with the ground during advancement of the machine and without reverse rotation of the wheels, plowing implements supported on opposite sides of the second frame in spaced relation to said ground engaging portions, releasable means for holding the second frame in its different positions of adjustment with respect to the first mentioned frame, and means for raising and lowering the first mentioned frame.

26. A plow comprising in combination, a pair of wheels, an axle connecting said wheels, a frame pivoted upon and extending forwardly of said axle, a second frame pivoted intermediate its ends for rotation about the axle in one direction through a circle to different positions of adjustment, right and left hand plows supported on opposite sides of the second frame, releasable means for holding the second frame in its different positions of adjustment, normally restrained raising means for the first frame operated automatically upon release by the travel of the machine, and means for manually effecting release of said raising means.

27. A plow comprising in combination, a pair of wheels, a frame supported by said wheels, a second frame pivoted upon the first to swing in one direction about a transverse axis through a circle to different positions of adjustment and having oppositely disposed portions arranged for engagement with the ground to rotate said second frame by the travel of the plow during forward rotation of the wheels, right and left hand plows supported on opposite sides of the second frame in spaced relation to said ground engaging portions, and means for holding the second frame in the different positions to which it is adjusted.

28. In a plow, the combination of ground engaging wheels, a frame having bearings thereon, supports for the frame journalled in the bearings and upon which the wheels are mounted to rotate, said supports when swung about the axis of the wheels serving to raise the frame, a plurality of plowing implements supported by said frame for rotation about a transverse axis in one direction through a circle to different positions of adjustment, means upon the frame for holding the implements in adjusted position, and means arranged to be operated by the travel of the plow for swinging said supports to raise the frame and the implements from plowing position relative to said wheels whereby to permit reversal of the implements by rotation about said axis.

29. In a plow, the combination of ground engaging wheels, a frame, a transversely extending support connecting the wheels and on which the frame is journaled, oppositely extending right and left hand plowing implements rotatable in one direction through a circle about the axis of the support, holding means upon the frame for said implements located upon the frame in front of the axis of the wheels and means arranged to be operated by the travel of the plow adapted to raise the frame during forward movement of the wheels, whereby to lift the plowing implements to permit reversal thereof.

30. In a plow, the combination of ground engaging wheels, a frame, a support comprising a crank arranged for a swinging movement relative to the frame, right and left hand plowing implements rotatable upon the crank to a predetermined position of adjustment relative to said frame, means for holding the implements in said adjusted position, and means arranged to be operated by the travel of the plow for moving the crank whereby to raise the implements to permit reversal thereof.

31. In a plow, the combination of ground engaging wheels, a frame, a support comprising a crank arranged for a swinging movement relative to the frame, right and left hand plowing implements rotatable upon the crank in one direction through a circle, means associated with the implements for cooperation with the ground during advancement of the plow whereby to effect rotation of the implements upon the crank to different positions of adjustment, means for holding the implements in adjusted position and means for effecting a swinging movement of the crank to raise the implements from operating position to permit reversal thereof.

32. In a plow, the combination of ground engaging wheels, a frame, a transversely extending crank arranged for a swinging movement relative to the frame, oppositely extending right and left hand plowing implements rotatable upon the crank in one direction through a circle, means connected with said implements arranged for engagement with the ground during advancement of the machine whereby to effect rotation of the implements upon the crank, holding means upon the first mentioned frame for engaging said last mentioned means to secure the implements in a predetermined position of adjustment, and means associated with said crank arranged to be operated by the travel of the plow to effect a swinging movement of the crank whereby to raise the plowing implements from operating position.

33. A plow comprising in combination, a pair of wheels, a frame, a member extending transversely between the wheels and having angularly disposed portions connected therewith and journaled in bearings on the frame to swing relative to the latter, oppositely extending right and left hand plowing implements mounted upon said transverse member for rotation in one direction through a circle to different positions of adjustment, means associated with said member for swinging the same to effect raising of the implements from plowing position during forward movement of the wheels whereby to permit reversal of the implements and means upon said frame for holding the implements in adjusted position.

34. A plow comprising in combination, a pair of wheels, a frame supported thereby, oppositely disposed right and left hand plowing implements, means for mounting said implements upon the frame for rotation in one direction through a circle about a transverse axis to different positions of adjustment, said frame and mounting means having relatively offset parts whereby to insure operation of the implements on substantially an even keel when in plowing position with either wheel operating in the furrow, and means for raising the frame to lift the plowing implements from operating position to permit reversal of the implements.

35. A plow comprising in combination, a pair of wheels, a frame including a transverse bar, oppositely disposed right and left hand plowing implements, supporting means for the implements mounted upon and rotatable about the axis of said bar in one direction through a circle to different positions of adjustment, said bar and supporting means having relatively offset parts arranged to maintain said implements on substantially an even keel while in plowing position with either wheel operating in the furrow, means for holding the implements in adjusted position, and means for raising the frame to lift the implements from plowing position to permit reversal of said implements.

36. A plow comprising in combination, a pair of wheels, right and left hand plowing implements, a frame supported by the wheels and on which the implements are mounted for rotation through a circle in one direction to different positions of adjustment, said frame including parts offset one relative to another to insure automatic positioning of the implements during rotation whereby they will operate on substantially an even keel when lowered to plowing position with either wheel operating in the furrow and means for raising the frame to elevate the plowing implements whereby to permit reversal of the implements.

37. A plow comprising in combination, a pair of wheels, a crank connecting the wheels, right and left hand plowing implements, a frame supported by the crank, said implements being releasably supported by the frame and mounted for rotation upon the crank through a circle in one direction to different positions of adjustment, said frame including bearings for said crank offset one relative to another to insure automatic positioning of the implements during rotation whereby they will operate on substantially an even keel when lowered to plowing position with either wheel operating in the furrow and means interposed between the crank and one of the wheels arranged to be operated by the travel of the latter for raising the crank to permit reversal of the plows thereon.

38. A plow comprising in combination, a pair of wheels, a frame supported thereby, a second frame mounted for rotation upon the first through a circle in one direction whereby to move it to different positions of adjustment, oppositely disposed right and left hand plowing implements carried by the second frame, said second frame including offset parts whereby to insure operation of the plowing implements on substantially an even keel when in plowing position, means on the first mentioned frame for holding the second frame in adjusted position, and means for raising the first mentioned frame to elevate the plowing implements whereby to permit reversal of the implements.

39. A plow comprising in combination, a pair of wheels, a main frame including side portions, crank means journalled upon and arranged to swing relative to said side portions to effect raising of the latter during forward moment of the wheels, oppositely extending right and left hand plowing implements, a second frame disposed between the implements and connected therewith, said second frame being mounted for rotation in one direction through a circle between said side portions and relative to the crank, means for holding the second frame in adjusted position, and means for operating said crank means to simultaneously effect raising of the main frame to permit rotation of the second frame from one position of adjustment to another.

40. In a plow, the combination of supporting wheel means, a plurality of plowing implements movable on said wheel means in a direction extending forwardly and rearwardly of the plow by contact with the ground to bring said implements alternately to plowing position, and elevating means operated by the travel of the plow for elevating said implements by downward pressure on said wheel means, to position said implements for movement to and from plowing position while maintaining said wheel means in contact with the ground.

41. In a plow, the combination of supporting wheel means, a main frame supported on said wheel means, a plurality of plowing implements supported by said frame to swing progressively in the same direction in the line of travel of the plow through actuation by contact with the ground to successive positions to bring said implements alternately to position for plowing, and elevating means arranged for connection with and actuated by the rotation of said wheel means and operating between said wheel means and frame for elevating said frame and implements relative to said wheel means, to position said implements for said swinging movements.

42. In a plow, the combination of a frame, supporting wheel means therefor, a second frame provided on opposite sides thereof with plowing implements and with portions projecting intermediate said implements, said second frame being connected with said first frame for rotation progressively in the same direction about a transverse axis to different plowing positions through contact of said implements and frame portions with the ground, releasable means for holding said second frame with either of said implements in plowing position, and wheel-actuated elevating means operating to raise said implements on said wheel means as a support, to position said implements for rotation to plowing position, while maintaining said wheels means in contact with the ground.

43. In a two-way plow, the combination of supporting wheels, right and left hand plowing implements supported by said wheel means for rotation about a transverse axis to bring said implements alternately to plowing position, said implements being provided with means for correcting the inclination thereof, respectively, to compensate for depression of either of said wheels in a furrow and elevating means operated by the travel of the plow for elevating said implements by downward pressure on said wheel means, to position said implements for movement to and from plowing position while maintaining said wheels on the ground.

44. In a two-way plow, the combination of a frame, wheels supporting said frame, a second frame provided with right and left hand plowing implements and rotatable about a transverse axis relative to said first frame to bring said implements alternately to plowing position, compensating means operated by the movement of said second frame for correcting the inclination of the implement in plowing position with either of the wheels in a furrow, and elevating means operated by the travel of the plow for elevating said implements relative to said wheels for movement to and from plowing position.

45. In a two-way plow, the combination of a frame, wheel means supporting said frame, a second frame provided on opposite sides thereof with right and left hand plowing implements and with intermediate projecting portions, said second frame being connected with the first for rotation progressively in the same direction to different plowing positions through contact of said implements and frame portions with the ground, compensating means operated by the rotation of said second frame for correcting the inclination of the implements in plowing position with either of the wheels in a furrow, releasable means for holding said second frame with either of said implements in plowing position, and elevating means operated by the rotation of said wheel means for elevating said implements for rotation to and from plowing position.

46. In a plow, the combination of a frame, a second frame provided with a plurality of plowing implements and associated with said first frame for rotation progressively in the same direction forwardly and rearwardly of the plow by contact with the ground to bring said implements alternately to position for plowing, bearing means in fixed position on said first frame, wheels for supporting said first frame, journals for said wheels having portions shiftable in said bearing means to permit elevation of said implements relative to said wheels, and means for securing said journal portions in said shifted positions for holding said first frame elevated during rotation of said second frame.

47. In a plow, the combination of a frame, a second frame provided with a plurality of plowing implements and associated with said first frame for rotation progressively in the same direction to different positions by contact with the ground, to bring said implements alternately to position for plowing, wheel means for supporting said frames, fixed bearings on said first frame on a transverse axis spaced from the axis of said wheels, crank means connected with said wheels and swinging in said bearings to support said frames in elevated relation to said wheels, and releasable means for securing said crank means in frame supporting position.

48. In a plow, the combination of a frame, a second frame provided with a plurality of plowing implements and associated with said first frame for rotation progressively in the same direction to different positions by contact with the ground, to bring said implements alternately to position for plowing, releasable means for securing said second frame in its different positions operating upon release to secure said second frame in its next succeeding position, wheel means for supporting said frames, and releasable means actuated by the rotation of said wheel means for elevating said frames relative to said wheels and operating upon release to secure said frames in elevated position, said elevating means being operable in advance of or simultaneously with the rotation of said second frame to maintain said wheels in contact with the ground.

49. In a plow, the combination of supporting wheel means, a main frame supported on said wheel means, a second frame provided with a plurality of plowing implements and mounted on said first frame to swing about an axis transverse to the line of travel of the plow to move said implements progressively in the same direction by contact with the ground to position said implements successively in position for plowing and mechanism operating between said main frame and wheel means for elevating both of said frames to afford clearance for said positioning movements of said implements while maintaining the weight of said frames on said wheel means and said wheel means in contact with the ground to preserve the equilibrium of the plow during positioning movements of said implements.

HENRY J. NEUFANG.